United States Patent
Harrington

(10) Patent No.: US 8,347,247 B2
(45) Date of Patent: Jan. 1, 2013

(54) VISUALIZATION INTERFACE OF CONTINUOUS WAVEFORM MULTI-SPEAKER IDENTIFICATION

(75) Inventor: Nathan J. Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 12/253,472

(22) Filed: Oct. 17, 2008

(65) Prior Publication Data

US 2010/0100376 A1  Apr. 22, 2010

(51) Int. Cl.
    *G06F 17/50* (2006.01)
(52) U.S. Cl. ........ 716/113; 716/108; 716/136; 716/109; 716/115; 379/88.02; 379/202.01; 701/101; 701/102
(58) Field of Classification Search .................. 716/113, 716/108, 136, 109, 115; 701/102, 101; 379/202.01, 379/88.02; 703/2, 13, 14; 340/440.2; 702/67, 702/71; 380/263, 46; 704/273, 270, 231, 704/235; 706/14; 707/661, 707, 827
See application file for complete search history.

(56) References Cited

U.S. PATENT DOCUMENTS

| | | | |
|---|---|---|---|
| 6,421,645 B1 | 7/2002 | Beigi et al. | |
| 6,931,113 B2 * | 8/2005 | Ortel | 379/202.01 |
| 6,934,756 B2 * | 8/2005 | Maes | 709/227 |
| 7,177,808 B2 | 2/2007 | Yantorno et al. | |
| 7,295,970 B1 | 11/2007 | Gorin et al. | |
| 7,318,032 B1 | 1/2008 | Chaudhari et al. | |
| 2004/0091086 A1 * | 5/2004 | Ortel | 379/88.02 |
| 2005/0207554 A1 * | 9/2005 | Ortel | 379/202.01 |
| 2006/0287863 A1 | 12/2006 | Santos et al. | |
| 2008/0181140 A1 * | 7/2008 | Bangor et al. | 370/261 |
| 2008/0270332 A1 * | 10/2008 | Rudolf | 706/14 |
| 2010/0250497 A1 * | 9/2010 | Redlich et al. | 707/661 |

* cited by examiner

*Primary Examiner* — Vijay B Chawan
(74) *Attorney, Agent, or Firm* — John Pivnichny; Roberts Mlotkowski Safran & Cole, P.C.

(57) ABSTRACT

A method implemented in a computer infrastructure having computer executable code having programming instructions tangibly embodied on a computer readable storage medium. The programming instructions are operable to receive a current waveform of a communication between a plurality of participants. Additionally, the programming instructions are operable to create a voiceprint from the current waveform if the current waveform is of a human voice. Furthermore, the programming instructions are operable to determine one of whether a match exists between the voiceprint and one library waveform of one or more library waveforms, whether a correlation exists between the voiceprint and a number of library waveforms of the one or more library waveforms and whether the voiceprint is unique. Additionally, the programming instructions are operable to transcribe the current waveform into text and provide a match indication display (MID) indicating an association between the current waveform and the one or more library waveforms based on the determining.

29 Claims, 6 Drawing Sheets

VISUALIZATION INTERFACE OF CONTINUOUS WAVEFORM MULTI-SPEAKER IDENTIFICATION

FIELD OF THE INVENTION

The present invention generally relates to speaker identification, and more particularly, to a visualization interface of continuous waveform multi-speaker identification.

BACKGROUND

Speaker identification authenticates a user from a biometric characteristic. For speaker identification, the biometric sample is compared to all records within the database and a closest match score is returned. The closest match within an allowed threshold is deemed the individual and authenticated. Thus, speaker identification is the task of determining an unknown speaker's identity, such that speaker identification is a 1:N match where the voice is compared against N templates.

Known solutions focus on providing speech-to-text solutions identifying what is being said, or require custom hardware to indicate when a pre-designated speaker is vocalizing. For example, known solutions monitor a "one microphone per speaker" circuit and provide visual notifications when the circuit is active for a particular speaker. Additionally, known solutions provide for speaker identification after a pre-enrollment step designed to establish a baseline voiceprint. Furthermore, know solutions translate speech to printed text.

For example, a conference call between a number of participants may be transcribed. However, the transcription will not indicate who is saying what dialogue. Thus, for a user, e.g., a hearing-impaired user, the transcription may be useless as the user cannot determine who said what in an ongoing dialogue. As a further example, a television program may contain closed-captioning. However, the closed-captioning will not indicate who is saying what dialogue. Rather, the closed-captioning contains the transcribed text without attribution to the speaker.

Furthermore, known solutions do not provide a visualization interface for augmenting speaker identification of an unknown number of users without pre-enrollment of voiceprints. Moreover, known solutions may require a library of known speakers, may require a separate microphone for each speaker, and/or may require segmented speech.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive a current waveform of a communication between a plurality of participants. Additionally, the programming instructions are operable to create a voiceprint from the current waveform if the current waveform is of a human voice. Furthermore, the programming instructions are operable to determine one of whether a match exists between the voiceprint and one library waveform of one or more library waveforms, whether a correlation exists between the voiceprint and a number of library waveforms of the one or more library waveforms, and whether the voiceprint is unique. Additionally, the programming instructions are operable to transcribe the current waveform into text and provide a match indication display (MID) indicating an association between the current waveform and the one or more library waveforms based on the determining.

In another aspect of the invention, a system comprises a human voice verification (HVV) tool operable to verify whether a received current waveform is of a human voice and a voiceprint creation (VPC) tool operable to create a voiceprint from the received current waveform if the received current waveform is of the human voice. Additionally, the system comprises a matching tool operable to determine one of whether a match exists between the voiceprint and one library waveform of one or more library waveforms, whether a correlation exists between the voiceprint and a number of library waveforms of the one or more library waveforms, and whether the voiceprint is unique. Additionally, the system comprises a display tool operable to transcribe the received current waveform into text and provide a match indication display (MID) indicating an association between the received current waveform and the one or more library waveforms based on the determining of the matching tool.

In an additional aspect of the invention, a computer program product comprising a computer usable storage medium having readable program code embodied in the medium is provided. The computer program product includes at least one component operable to receive a current waveform of a communication between a plurality of participants and create a voiceprint from the current waveform. Additionally, the at least one component is operable to determine one of whether a match exists between the voiceprint and one library waveform of one or more library waveforms, whether a correlation exists between the voiceprint and a number of library waveforms of the one or more library waveforms, and whether the voiceprint is unique. Furthermore, the at least one component is operable to transcribe the current waveform into text and provide a match indication display (MID) displaying the text and indicating an association between the current waveform and its associated text, and the one or more library waveforms based on the determining.

In a further aspect of the invention, a method comprises providing a computer infrastructure operable to receive a current waveform of a communication between a plurality of participants and verify whether the current waveform is of a human voice. Additionally, the computer infrastructure is operable to create a voiceprint from the current waveform if the current waveform is of the human voice. Furthermore, the computer infrastructure is operable to determine one of whether a match exists between the voiceprint and one library waveform of one or more library waveforms, whether a correlation exists between the voiceprint and a number of library waveforms of the one or more library waveforms, and whether the voiceprint is unique. Additionally, the computer infrastructure is operable to transcribe the current waveform into text and provide a match indication display (MID) displaying the text and indicating an association between the current waveform and its associated text, and the one or more library waveforms based on the determining. Moreover, at least one of the receiving, the verifying, the creating, the determining, the transcribing and the providing occurs in real-time.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
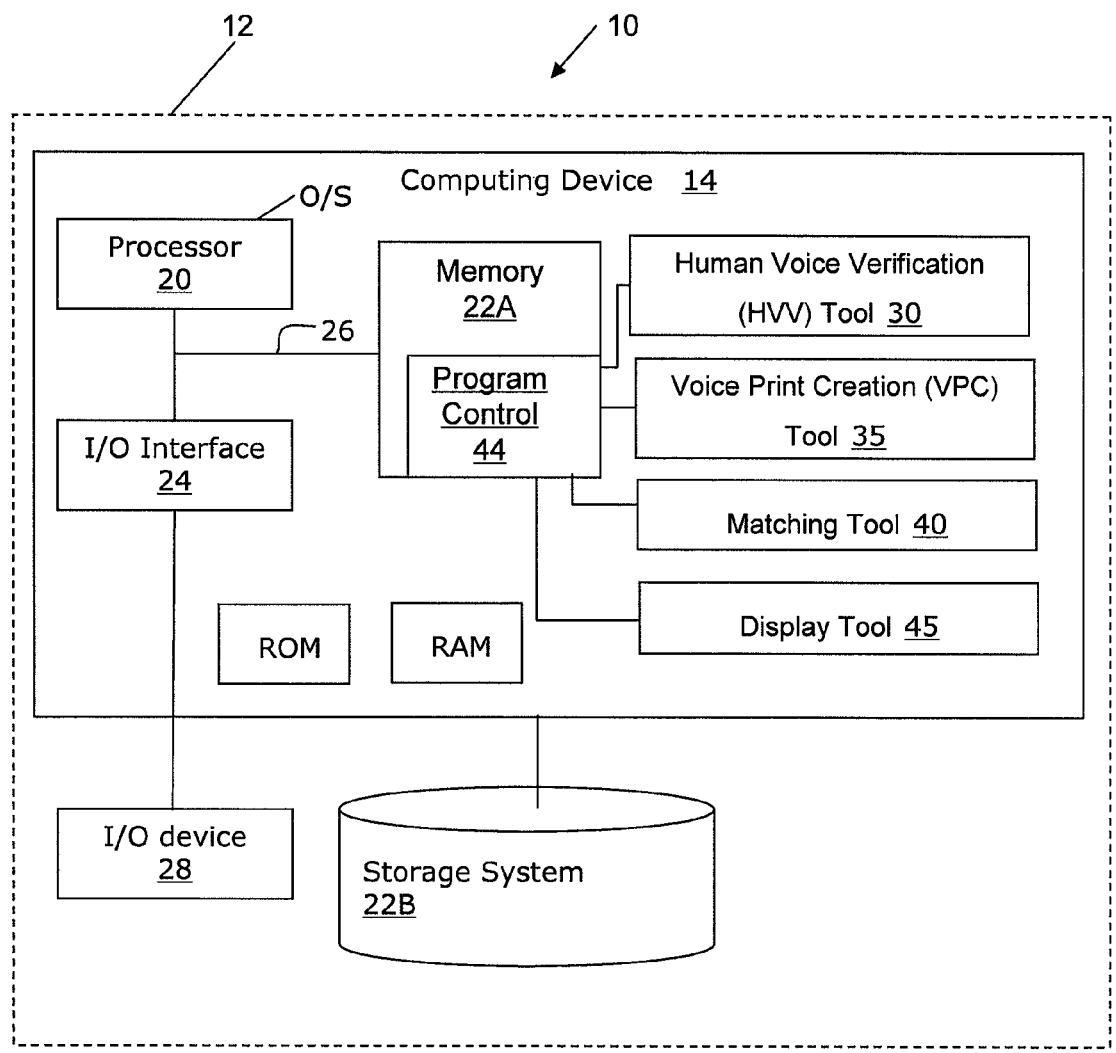
FIG. 1 shows an illustrative environment for implementing the steps in accordance with the invention.

The present invention generally relates to speaker identification, and more particularly, to a visualization interface of continuous waveform multi-speaker identification. By implementing the present invention, enhanced speaker identification is provided to users, e.g., hearing impaired individuals in a multi-speaker context with associated text. Furthermore, implementing the present invention provides a visualization interface for augmenting speaker identification of an unknown number of users without pre-enrollment of voiceprints. Moreover, the present invention does not require a library of known speakers and does not require segmented speech, as it is a continuous waveform processing system. The present invention can handle the acquisition and description of any large number of speakers using a single microphone, and provides a visual interface to help the operator associate transcribed text with certain speakers.

According to aspects of the present invention, received sounds are analyzed and associated with or verified as human speech. Additionally, the present invention provides a visual matching interface to create an indicator of the likely speaker. For example, consider that an individual new to an organization joins a conference call in progress that is being transcribed for the hearing impaired. The individual, who, e.g., may be hearing impaired, may activate the invention described herein which monitors the phone line audio. When human speech is detected, the matching methodologies described below automatically categorize the various speakers according to their characteristics of their voice. At each match, the corresponding transcribed text is listed next to the matching waveform to provide the user with more precise knowledge about who is speaking and what is spoken.

In addition, in embodiments, the transcript of the spoken text provided (from, e.g., a closed-captioned television program, transcribed teleconference, or speech recognition program), appears next to the waveforms' position in the visualization section. This correlation between matched waveforms and transcribed text provides a library of speech associated with a particular voice waveform. The completed visualization then allows listeners to a conference call to get a more accurate picture of who is speaking, especially in, for example, bandwidth limited contexts with multiple speakers, such as conference calls.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a human voice verification (HVV) tool 30, a voiceprint creation (VPC) tool 35, a matching tool 40 and a display tool 45. The HVV tool 30, the VPC tool 35, the matching tool 40 and the display tool 45 are operable to receive an input waveform, determine whether the waveform is a human voice, create a voiceprint of the waveform, match the waveform to a library waveform using the voiceprint, and display the matching to a user, e.g., the processes described herein. The HVV tool 30, the VPC tool 35, the matching tool 40 and the display tool 45 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the HVV tool 30, the VPC tool 35, the matching tool 40 and the display tool 45. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network; a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Human Voice Verification Tool

According to aspects of the invention, an input waveform is acquired by, e.g., a personal computer device using an onboard microphone. The human voice verification (HVV) tool 30 receives the input waveform and processes it to verify that the input waveform contains attributes of a human voice. For example, in embodiments, the HVV tool 30 verifies the input waveform as a human voice if, e.g., ninety percent or more of the recorded frequencies occur in the frequency band from 200-800 Hz. That is, the human voice is approximately within a frequency band from 200-800 Hz. Thus, if the HVV tool 30 detects an input waveform as containing ninety percent or more of the recorded frequencies in the frequency band from 200-800 Hz, the HVV tool 30 verifies the input waveform as a human voice.

In embodiments, the HVV tool 30 may employ noise reduction methodologies to improve accuracy. This is because ambient noise levels can impede the collection of voice samples.

Voiceprint Creation Tool

In accordance with further aspects of the invention, the voiceprint creation (VPC) tool 35 creates a data set that is the 'voiceprint' of the currently sampled waveform. More specifically, the VPC tool 35 receives each acquired input waveform sample that has been verified as a human voice by the HVV tool 30. The VPC tool 35 divides the input waveform into, e.g., two hundred equal length segments in the 200-800 Hz range. Thus, with this exemplary embodiment, the VPC tool 35 will divide the input waveform into two hundred segments of 30 Hz each. After a default number of audio input waveform samples have been read, the VPC tool 35 records the total number of values exceeding a volume threshold for each of the 200 equal length segments. For example, the VPC tool 35 may determine the amplitude for each segment as a simple integer. This creates a data set that is the 'voiceprint' of the currently sampled waveform, which is updated, for example, approximately ten times per second. As the voiceprint is updated, e.g., ten times per second, the VPC tool 35 continually averages the amplitudes for each of the 200 equal length segments, such that a more accurate voiceprint is continually obtained. In embodiments, the default number of audio input waveform samples may be, for example, twenty (i.e., two seconds of speech). However, as should be understood, in embodiments, the default number of audio input waveform samples may be user configurable. Furthermore, in embodiments, the volume threshold may be user-configurable such that the volume threshold may be adjusted for different environments.

In additional embodiments, the VPC tool 35 may utilize, for example, the acoustic features of speech that have been found to differ between individuals. It should be understood that a speaker's voice is a physiological trait and a behavioral trait. A voice may be classified as a physiological trait, as acoustic patterns reflect anatomy (e.g., size and shape of the throat and mouth, amongst other anatomic features) of a speaker, causing for example, a particular pitch. On the other hand, in embodiments, a voice may be classified as behavioral trait based on the study of the way a person speaks, for example, learned behavioral patterns (e.g., voice pitch, speaking style, amongst other learned behavioral patterns).

In embodiments, the library of existing voiceprints may be stored in a database, e.g., the storage system 22B of FIG. 1. Additionally, as should be understood, at the initiation of a conversation, the library of existing voiceprints may not contain any voiceprints. Rather, as the conversation proceeds, the VPC tool 35 may create the library of existing voiceprints in real-time. That is, as should be understood, the present invention is operable to match a currently received waveform with a speaker amongst a plurality of speakers without previously requiring the collection of voiceprints from the plurality of speakers (known as pre-enrollment). Thus, upon initiation of the present invention for a particular dialogue, the waveform library may have no stored voiceprints. However, as the dialogue progresses, the VPC tool 35 continues to sample the received current waveforms from the different speakers and "builds" a waveform library of voiceprints. Thus, for example, with a first speaker, there may be no voiceprint in the waveform library to which the current waveform of the first speaker may be compared. However, as the first speaker continues their dialogue, the VPC tool 35 will establish a voiceprint for the first speaker and the matching tool 40 (described further below) determines a match between the current waveform for the first speaker and the voiceprint of the first speaker (as, at this point, there is only one library waveform).

In describing the invention, reference is made to preexisting voiceprints. However, as should be understood, in embodiments, these preexisting voiceprints do not exist prior to commencement of the current dialogue. That is, the preexisting voiceprints may be preexisting relative to a subsequently received current waveform. However, as should also be understood, the present invention contemplates that, in embodiments, at least some participants in a dialogue may have established voiceprints prior to commencement of a dialogue.

Matching Tool

In accordance with additional aspects of the invention, in embodiments, the matching tool 40 compares the current voiceprint to the library of existing voiceprints. More specifically, the matching tool 40 compares each of the two hundred frequency segments for an integer difference between the current voiceprint frequency segment and the corresponding frequency segment in the library voiceprint. If the matching tool 40 determines that, for each of the two hundred segments, the total difference is less than a match threshold, the matching tool determines that the current waveform is a match to the waveform from the library that is currently being compared. Additionally, if the matching tool 40 determines a match, the matching tool 40 may average the currently processed waveform with the library waveform to create a more accurate voiceprint and further increase the number of 'match' samples for that library waveform entry.

In additional exemplary embodiments, the matching tool 40 may utilize various technologies to process and analyze voiceprints. For example, in embodiments, the matching tool 40 may utilize frequency estimation, hidden Markov models, Gaussian mixture models, pattern matching methodologies, neural networks, matrix representation and decision trees, amongst other technologies.

On the other hand, if the matching tool 40 determines that a total difference between currently processed waveform and the library waveforms the is more than a unique threshold, then the matching tool 40 instructs the VPC tool 35 to add the currently processed waveform to the library as a unique voice. In embodiments, the unique threshold may be user-configurable. Furthermore, the matching tool 40 may detect a currently received waveform that neither exceeds the match threshold nor the unique threshold. In this scenario, the matching tool 40 is operable to determine a percentage of matching between, e.g., a plurality of preexisting voiceprints. That is, if the matching tool 40 is unable to conclusively determine that a currently received voice stream is a match to a preexisting voiceprint and is unable to conclusively determine that the currently received voice stream is a unique voice, the matching tool 40 is operable to determine a likely match to a preexisting voiceprint (or a number of preexisting voiceprints) by determining a match percentage, as described further below.

Furthermore, in accordance with aspects of the invention, in embodiments, the matching tool 40 may additionally utilize origin of voice detection to match a current waveform with its associated speaker. As should be understood, origin of voice detection can determine the source of a voice, e.g., an internal line versus an external line.

Display Tool/Match Indicator Display

Figure 2:
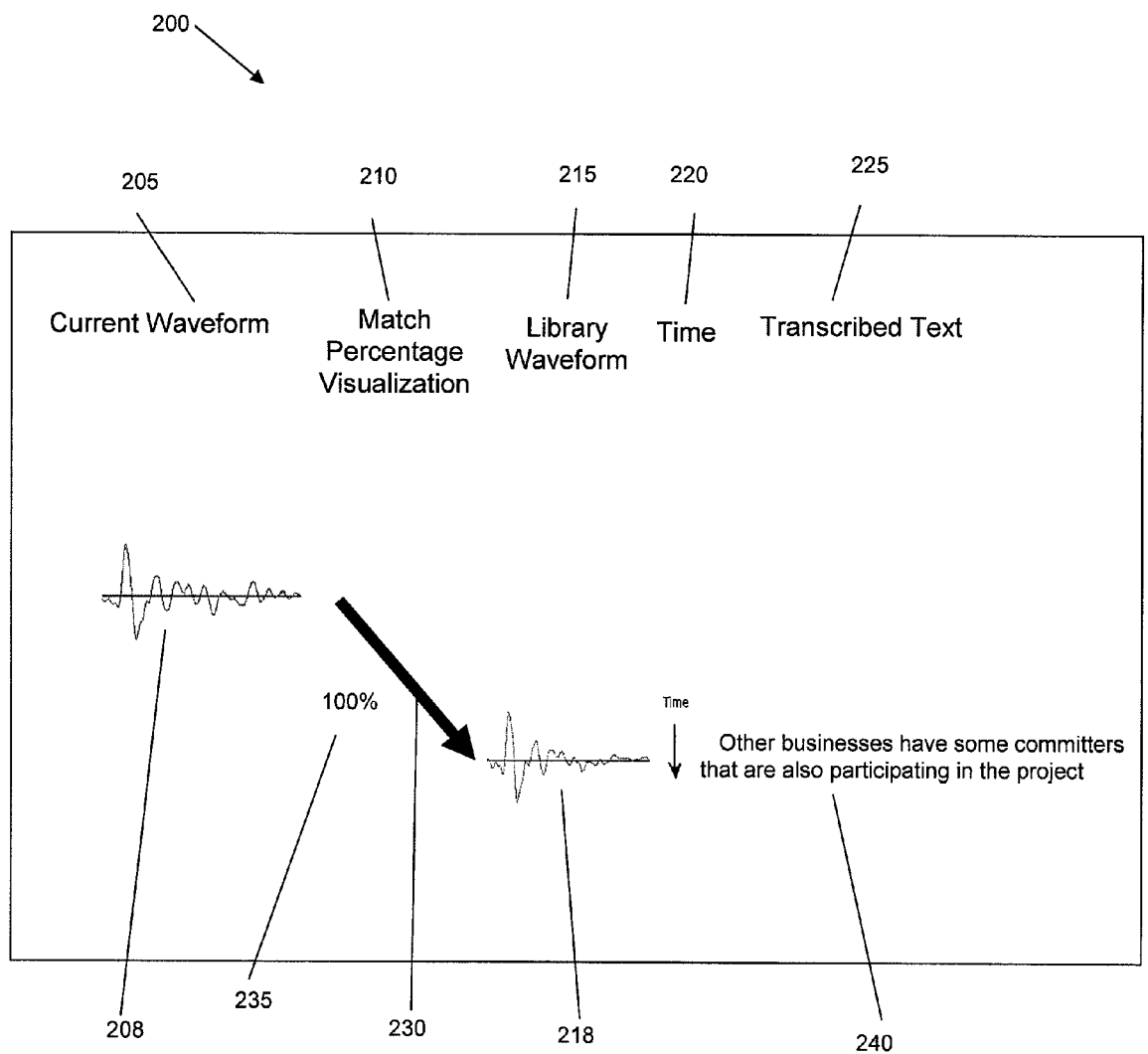
FIGS. 2-5 show exemplary match indicator displays in accordance with aspects of the present invention.

In accordance with further aspects of the invention, the display tool 45 is operable to create a match indicator display. FIG. 2 shows an exemplary match indicator display (MID) 200 in accordance with aspects of the invention. As shown in FIG. 2, in embodiments, the MID 200 may include a current waveform column 205 displaying a currently received waveform 208 and a match percentage visualization column 210 for displaying. In embodiments, the MID 200 also displays a match percentage 235 and an indicator arrow 230, which visually indicates which library waveform 218 the matching tool 40 has matched to the currently received waveform 208. Additionally, the MID 200 may include a library waveform column 215 for displaying the waveform voiceprints 218 currently stored in the library. These waveform voiceprints are displayed to the user, so that, for example, the user can visually compare the one of more waveform voiceprints in the library with the currently received waveform. That is, in situations, as explained further below, the matching tool 40 may determine that a currently received waveform has some level of correlation with more than one of the waveform voiceprints in the library. Thus, according to aspects of the invention, the visual display of the currently received waveform and the waveform voiceprints in the library may aid a user in determining a proper match. In addition, the MID 200 may include a time column 220 indicating a direction of time flow pertaining to the received voice streams, as explained further below. Furthermore, the MID 200 may include a transcribed text column 225, which displays a transcription of the ongoing dialogue.

The display tool 45 updates the MID 200 based on the attributes 'match' quality of the current waveform, as determined by the matching tool 40. For example, as shown in the exemplary MID 200 of FIG. 2, if the matching tool 40 determines that the currently received waveform 208 is a match to a previously existing waveform in the library (i.e., exceeds the match threshold), the display tool 45 provides the indicator arrow 230 from the current received input waveform 208 to the matching waveform 218 from the library. Additionally, the display tool 45 is operable to transcribe the received waveform from speech to text, and associatively display the transcribed text 240 in the transcribed text column 225.

Furthermore, as shown in FIG. 2, in embodiments, the MID 200 also displays a numerical match percentage 235. With this exemplary MID 200, as the matching tool 40 determined that the current waveform met the match threshold, the match percentage 235 is one-hundred percent. However, as should be understood, in embodiments, the match percentage 235 may not necessarily indicate the actual percentage of match between a current waveform and a library waveform, but rather may indicate the percentage of match relative to the match threshold. For example, if the match threshold, which may be user-configurable, requires a ninety-five percent match between a current waveform and a library waveform, and a current waveform meets this match threshold, then the matching percentage 235 may be one-hundred percent even though there is not a one-hundred percent match between the current waveform and the library waveform. If the match percentage 235 is one-hundred percent (i.e., the match threshold has been met) and a single indicator arrow 230 is displayed, it may be unnecessary to display the match percentage 235. Thus, in embodiments, when the matching tool 40 determines that a current waveform 208 meets or exceeds the match threshold, then the display tool 45 may not display the matching percentage 235.

Figure 3:
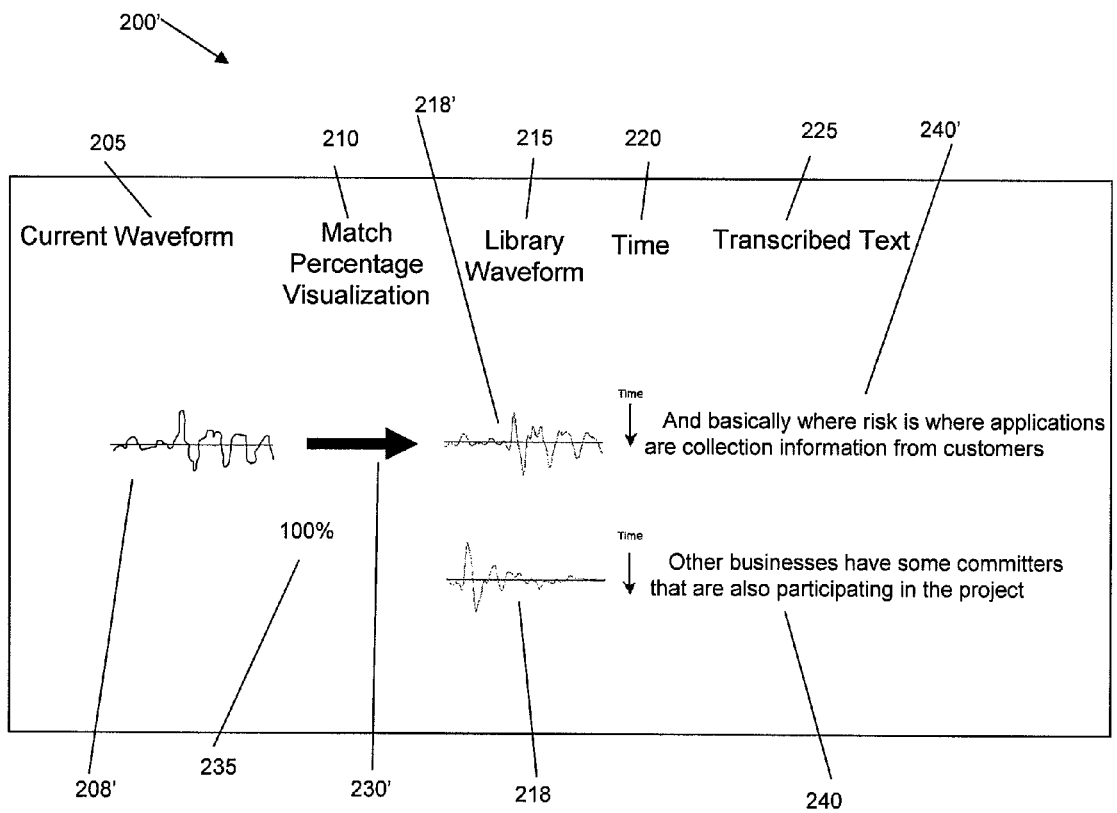

FIG. 3 shows an exemplary MID 200', which is the MID 200 of FIG. 2 after receiving an additional input waveform from a new speaker. More specifically, MID 200' indicates that the matching tool 40 determined that a new input waveform 208' did not exceed the matching threshold for the library waveform 218. Moreover, the MID 200' indicates that the matching tool 40 determined that the new input waveform 208' did exceed the unique threshold. Accordingly, the matching tool 40 instructs the VPC tool 35 to add the currently processed waveform 208' to the library as a unique voice. Thus, with this exemplary MID 200', the VPC tool 35 has added voiceprint waveform 218' to the library of waveform voiceprints and the display tool 45 has displayed the added voiceprint 218' in the library waveform column 215. Furthermore, the display tool 45 has provided an indicator arrow 230' and a match percentage 235' indicating that the currently received waveform 208' is a match with the added voiceprint 218'.

Additionally, as shown in FIG. 3, the display tool 45 has transcribed the received current waveform 208' from speech to text and updated the transcribed text column 225, e.g., in real-time with the transcribed text 240' of the current waveform 208'. Moreover, the transcribed text 240' is associatively displayed with the identified library waveform 218' (and any previously transcribed text previously associated with the identified library waveform). As shown in FIG. 3, as this is the first transcribed text for this speaker, the transcribed text 240' for the current waveform 208' is the only transcribed text associatively displayed with the library waveform 218' for this speaker.

Figure 4:
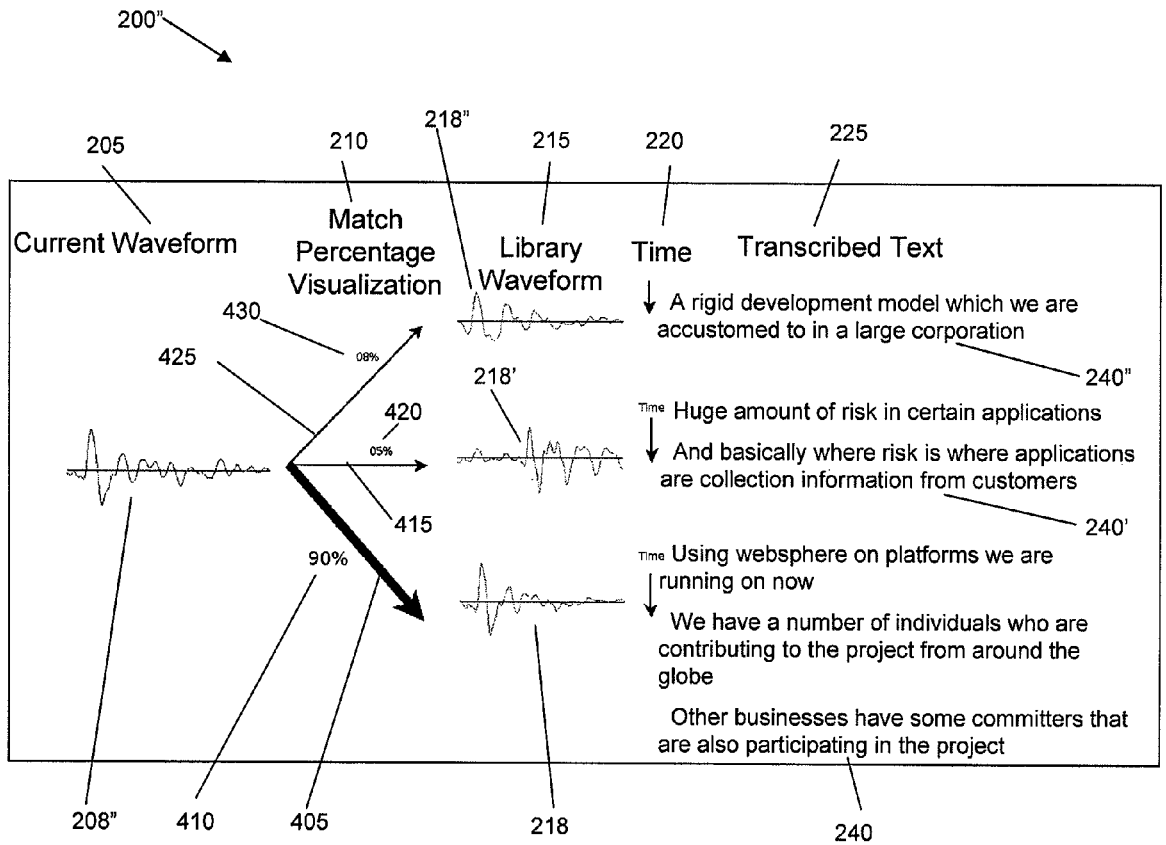

FIG. 4 shows an exemplary MID 200", which is the MID 200' of FIG. 3 after receiving additional input waveforms. Thus, as shown in FIG. 4, the display tool 45 has transcribed additional input waveforms from speech to text and updated the transcribed text column 225, e.g., in real-time with the transcribed text 240, 240' and 240". The transcribed text 240' is associatively displayed with the identified library waveform 218' (and any previously transcribed text previously associated with the identified library waveform). Additionally, the transcribed text 240" is associatively displayed with the identified library waveform 218". As shown in FIG. 4, as this is the first transcribed text for this speaker, the transcribed text 240" is the only transcribed text associatively displayed with the library waveform 218" for this speaker.

As described above, if the matching tool 40 is unable to conclusively determine that a currently received voice stream is a match to a preexisting voiceprint in the library and is unable to conclusively determine that the currently received voice stream is a unique voice, the matching tool 40 is operable to determine a likely match to a preexisting voiceprint (or a number of preexisting voiceprints) by determining a match percentage (or percentage of correlation) between the current waveform and the preexisting voiceprints. Moreover, as shown in FIG. 4, the display tool 45 is operable to display this determined match percentage between the current waveform 208" and the preexisting voiceprints 218, 218' and 218" in the MID 200".

For example, as shown in FIG. 4, the display tool 45 has displayed the MID 200" indicating that the currently received waveform 208" has a ninety percent correlation 410 with library waveform 218, has a five percent correlation 420 with library waveform 218' and has an eight percent correlation 430 with library waveform 218", as determined by the matching tool 40. It should be understood that these correlation percentages need not sum to one hundred percent. As shown in FIG. 4, the width of the indicator arrows 405, 415 and 425 indicate an amount of correlation relative to the other identified library waveforms. Thus, the indicator arrow 405 between the current waveform 208" and the library waveform 218 has a larger width as compared to either the indicator arrow 415 between the current waveform 208" and the library waveform 218' and the indicator arrow 425 between the current waveform 208" and the library waveform 218". Also, the indicator arrow 425 between the current waveform 208" and the library waveform 218" has a larger width as compared to the indicator arrow 415 between the current waveform 208" and the library waveform 218'.

Moreover, in embodiments, as the matching tool 40 detects a decreasing deviation between the currently received waveform 208" and one of the previously existing library waveforms (e.g., 218, 218' and 218"), the display tool 45 may update the MID 200", e.g., in real-time to display the indicator arrow 230" between the currently received waveform and the library waveform having an increasing width. That is, as the matching tool 40 determines a greater degree of correlation (and thus a greater match percentage), the display tool 45 may increase the width of the indicator arrow, e.g., 405 to reflect this increased degree of correlation. Thus, as can be observed comparing the indicator arrow 405 of FIG. 4 indicating a ninety percent correlation with the indicator arrow 230' of FIG. 3 indicating a one-hundred percent match, the indicator arrow 230' has a slightly larger width than the indicator arrow 405. Also, as the matching tool 40 determines a lower degree of correlation, the display tool 45 may decrease the width of the indicator arrow, e.g., 405 (or remove the indicator arrow) to reflect this decreased degree of correlation (or lack of any correlation).

Additionally, as shown in FIG. 4, the display tool 45 has transcribed the received current waveform 208" from speech to text and updated the transcribed text column 225, e.g., in real-time with the transcribed text 240 of the current waveform 208". Moreover, the transcribed text 240 is associatively displayed with the identified library waveform 218 (and any previously transcribed text previously associated with the identified library waveform). In embodiments, if the matching tool 40 determines that one of the library waveforms (e.g., 218, 218' or 218") correlates to the current waveform 208" to a much greater extent than the other library waveforms, as explained further below, the display tool 45 may associatively display the transcribed text of the current waveform 208" with the library waveform having the greatest extent of correlation.

Thus, with the exemplary MID 200" of FIG. 4, as the matching tool 40 determined a ninety percent correlation 410 between the current waveform 208" and the library waveform 218 (as compared to the five percent correlation of library waveform 218' and the eight percent correlation of library waveform 218"), the display tool 45 has associatively displayed the transcribed text of the current waveform 208" with the library waveform 218. More specifically, the display tool 45 has associatively displayed "Using websphere on platforms we are running now" with the library waveform 218 (and the previously transcribed text previously associated with the identified library waveform). (Websphere® is a registered trademark of International Business Machines Corporation in the United States, other countries, or both.)

Moreover, as shown in FIG. 4, in embodiments, the transcribed text for a more recently received current waveform for a particular speaker is placed above the previously received transcribed text for that speaker. That is, in embodiments, transcribed text for a more recently received current waveform of a particular speaker is displayed at the top of the ongoing transcribed text list for that speaker. Moreover, the time column 220, indicates the temporal relationship of the transcribed text associated with each library waveform. More specifically, the time column 220 indicates an increasing passage of time. Thus, with this example, "Using websphere on platforms we are running now" was the most recent transcribed text associated with the library waveform 218 and the transcribed text "Other businesses have some committers that are also participating in the project" is the least recent transcribed text associated with the library waveform 218. In embodiments, this allows a user, e.g., a hearing impaired user, to more closely follow the sequence or order of the ongoing dialogue.

Additionally, while not shown in the figures, in embodiments, the present invention may also indicate the relative temporal order of the portions of transcribed text associated with the library waveform of a particular speaker. In this way, a user who may have, for example, temporarily stepped away from the MID 200" to determine the flow and order of the ongoing dialogue. Thus, in embodiments, the color of the indicator arrow, e.g., 405 between matching waveforms may be graduated according to the location in time of the last match. For example, an indictor arrow may be blue which shows where the current waveform is being matched, which moves through green, through red and finally to black for less recently received current waveform, e.g., more than a preset threshold (for example, one minute). In other exemplary embodiments, the indicating arrows may fade or become more transparent with the passage of time. In further exemplary embodiments (shown below in FIG. 5 and described further below), the display tool 45 may assign each portion of transcribed text a number in, e.g., ascending order based on the order of receipt the respective current waveforms and may display the assigned number alongside the transcribed text, for example, in the time column 220 in order to indicate the relative temporal order of the portions of transcribed text associated with the library waveform of a particular speaker.

While the exemplary MID 200" of FIG. 4 shows some level of correlation between the current waveform 208" and each of the library waveforms 218, 218' and 218", as should be understood, the matching tool 40 may not determine a correlation between the current waveform 208" and each of the library waveforms 218, 218' and 218". That is, for example, the matching tool 40 may determine a correlation between the current waveform 208" and only library waveforms 218 and 218'.

As described above, in embodiments, when the matching tool 40 is unable to establish a match for the current waveform (i.e., the matching threshold is not met) and is unable to establish the current wave form as a unique voice (i.e., the unique threshold is not met), the matching tool 40 is operable to determine a best correlation between the current waveform and a number of library waveforms and the display tool 45 is operable to display match percentages and indicator arrows. However, the invention contemplates that, in situations, the matching tool 40 may determine that a given current waveform is closely correlated with more than one library waveform.

Thus, in embodiments, the matching tool 40 may compare the determined match percentages and determine their relative weights as compared to the highest determined match percentage. Moreover, the determined relative weights may be compared to a relative weight threshold, and if none of the relative weights exceeds the threshold, the matching tool 40 may associatively display the transcribed text with the library waveform having the highest determined match percentage. However, if any of the relative weights exceeds the threshold, the matching tool 40 may display the transcribed text as described further below.

For example, as shown in FIG. 4, the matching tool 40 has determined three match percentages (ninety percent 410, five percent 420 and eight percent 430). The matching tool 40 may determine the relative weights of the lower match percentages as compared to the largest match percentage. Thus, with this example, the matching tool would determine relative weights of 5/90=0.056 or 5.6% and 8/90=0.089 or 8.9%. The matching tool 40 compares these relative weights with a relative weight threshold, e.g., fifty percent. (It should be understood that the relative weight threshold may be user-configurable.) However, with this example, as neither of these relative weights exceeds the relative weight threshold, as shown in FIG. 4, the matching tool 40 has assigned the current wave form 208" (and its transcribed text) to the library waveform 218, and the display tool 45 has associatively displayed the transcribed text, e.g., "Using websphere on platforms we are running on now" with the library waveform 218.

Figure 5:
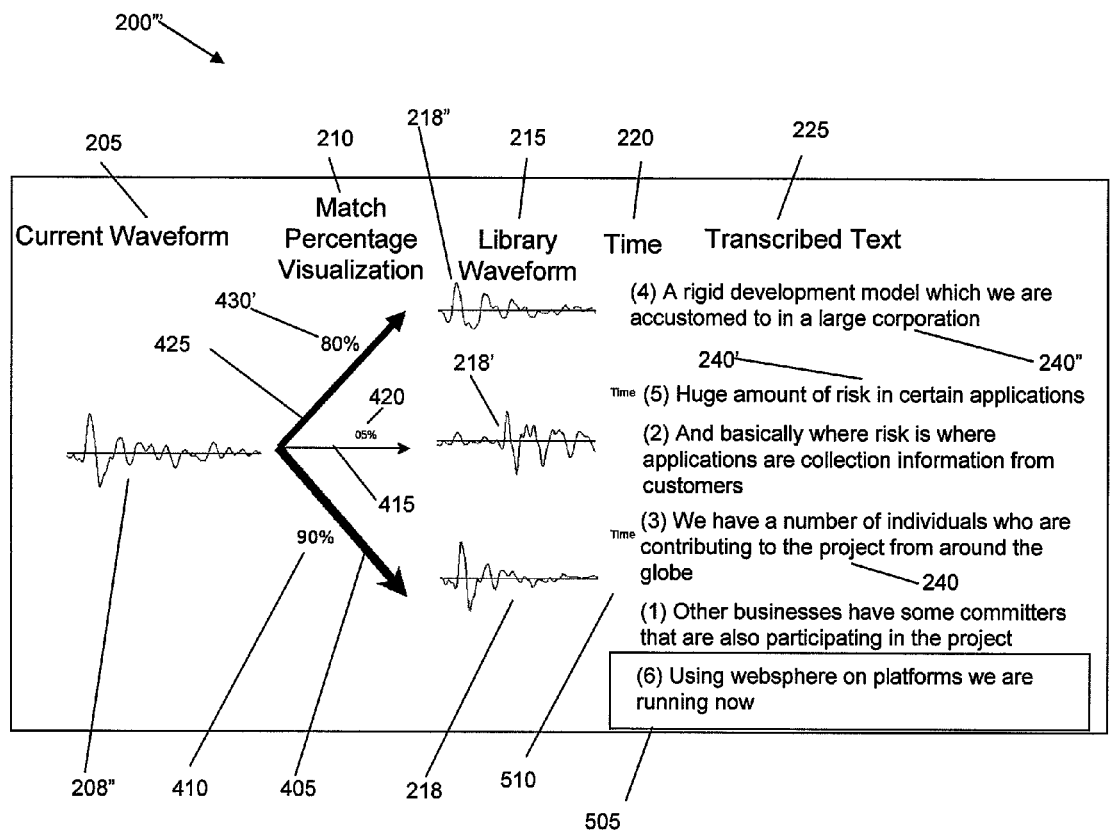

FIG. 5 shows an exemplary MID 200''', which is similar to the MID 200" of FIG. 4, but shows a higher match percentage between the current waveform 208" and the library waveform 218". More specifically, while the example of FIG. 4 shows a match percentage 430 of eight percent between the current waveform 208" and the library waveform 218", the example of FIG. 5 shows a match percentage 430' of eighty percent between the current waveform 208" and the library waveform 218". Thus, with the example of FIG. 5, the relative weight for library waveform 218" is 80/90=0.889 or 88.9%. In comparing the determined relative weight to the relative weight threshold, e.g., fifty percent, the matching tool 40 determines that the relative weight for library waveform 218" exceeds the relative weight threshold. Thus, with this example, at this point, the matching tool may not be able to conclusively determine which library waveform to associate the current waveform (and its transcribed text) with.

Thus, according to further aspects of the invention, in embodiments, the MID 200''' may include an unassigned transcribed text window 505. Moreover, if the matching tool 40 determines that the relative weight threshold is exceeded, and thus the matching tool 40 is not currently able to determine to which library waveform the transcribed text should be associatively displayed, the display tool 45 may display the transcribed text of the current waveform in the unassigned transcribed text window 505. In this way, for example, a user, e.g., a hearing impaired user, would still be able to read the text of the dialogue, e.g., in real-time, even though the user may not yet be informed as to who is speaking. Thus, as shown in FIG. 5, the transcribed text "Using websphere on platforms we are running now" is displayed in the unassigned transcribed text window 505.

However, as explained above, the matching tool 40 operates in real-time sampling and analyzing the current waveform, for example, ten times per second. Thus, as the stream of the current waveform is received, the matching percentages may change in real-time to reflect the real-time match percentage determinations. Thus, the invention contemplates that the transcribed text of the current waveform may initially be displayed in the unassigned transcribed text window 505, but subsequently associatively displayed with one of the library waveforms (and the previously transcribed text previously associated with the identified library waveform).

Additionally, the invention contemplates that the transcribed text of the current waveform may initially be associatively displayed with one of the library waveforms (and the previously transcribed text previously associated with the identified library waveform), but subsequently displayed in the unassigned transcribed text window 505. That is, in embodiments, for example, there may be some latency when a previous speaker ceases talking and a new speaker begins to talk. During this latency, the matching tool 40 may continue to associate the current waveform with the library waveform of the previous speaker for a period of time. Thus, the display tool 45 may temporarily associatively display the transcribed text with the previous speaker. However, as a larger sample size of the current waveform is received, the matching tool 40 may update the match percentages and indicator arrows, such that the display tool 45 displays the transcribed text, e.g., temporarily, in the unassigned transcribed text window 505 (and removes the transcribed text associatively display the transcribed text with the previous speaker) or associatively displays the transcribed text with the library waveform of the current speaker.

Additionally, the exemplary MID 200" shown in FIG. 5 includes a numerical indication of the relative temporal relationship of the different portions of transcribed text, as described above. More specifically, with this example, the display tool 45 assigns each portion of transcribed text a number 510 in, e.g., ascending order based on the order of receipt the respective current waveforms and displays the assigned number 510 alongside the transcribed text, for example, in the time column 220. Thus, in embodiments, a user may determine a relative order of the passages of transcribed text by referencing the numbers 510.

Flow Diagram

Figure 6:
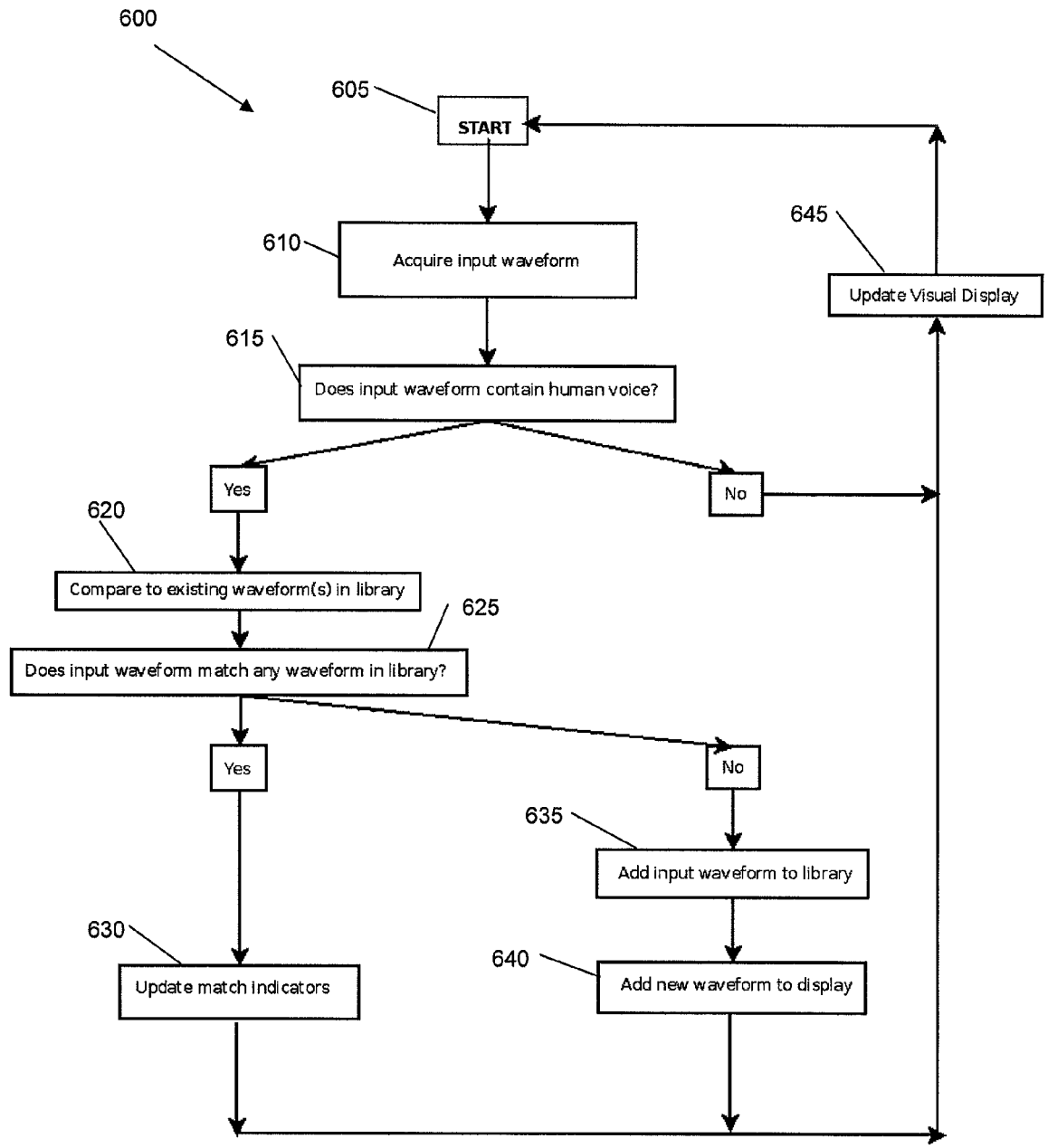
FIG. 6 shows an exemplary flow for practicing aspects of the invention.

FIG. 6 shows an exemplary flow for performing aspects of the present invention. The steps of FIG. 6 may be implemented in the environment of FIG. 1, for example. The flow diagram may equally represent a high-level block diagram of the invention. The flowchart and/or block diagram in FIG. 6 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function (s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 6 shows an exemplary flow diagram 600 for providing a visualization interface of continuous waveform multi-speaker identification in accordance with aspects of the present invention. At step 605, the process commences. At step 610, the human voice verification (HVV) tool receives an input waveform. At step 615, the HVV tool determines whether the input waveform contains a human voice. If, at step 615, the HVV tool determines that the input waveform does not contain a human voice, the process proceeds to step 645, where the display tool updates the visual display. For example, in this scenario, the display tool may remove the current input waveform from the match indicator display (MID) as it is not a waveform of a human voice.

If, at step 615, the HVV tool determines that the input waveform does contain a human voice, the process proceeds to step 620. At step 620, the voiceprint creation (VPC) tool creates a voiceprint from the input waveform and the matching tool compares the voiceprint to the waveforms in the waveform library. At step 625, the matching tool determines whether the voiceprint of the input waveform matches and/or correlates with any of the waveforms in the waveform library. If, at step 625, the matching tool determines that the voiceprint of the input waveform matches and/or correlates with any of the waveforms in the waveform library, the process proceeds to step 630, where the display tool updates the match indicators, e.g., the match percentages and/or the indicator arrows. If, at step 625, the matching tool determines that the voiceprint of the input waveform does not match or correlate with any of the waveforms in the waveform library, the matching tool determines that the voiceprint meets the unique threshold, and proceeds to step 635. At step 635, the VPC tool adds the unique voiceprint for the input waveform to the waveform library. At step 640, the display tool updates the MID by adding the new waveform voiceprint to the MID and updates the match indicators, e.g., the match percentages and/or the indicator arrows, and proceeds to step 645. At step 645, the display tool updates the MID, for example, by associatively displaying the transcribed text, and in embodiments, updating any temporal indicators, e.g., the color of the indicator arrows, the transparency of the indicator arrows and/or the order numbers. The process then proceeds to step 605 in an ongoing manner to continually receive incoming waveforms.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   receive a current waveform of a communication between a plurality of participants;
   create a voiceprint from the current waveform if the current waveform is of a human voice;
   determine one of:
      whether a match exists between the voiceprint and one library waveform of one or more library waveforms;
      whether a correlation exists between the voiceprint and a number of library waveforms of the one or more library waveforms; and
      whether the voiceprint is unique;
   transcribe the current waveform into text; and
   provide a match indication display (MID) indicating an association between the current waveform and the one or more library waveforms based on the determining.

2. The method of claim 1, further comprising displaying the current waveform and the one or more library waveforms.

3. The method of claim 2, further comprising associatively displaying the text with its associated library waveform.

4. The method of claim 1, wherein the indicating the association comprises displaying at least one of a match percentage and an indicator arrow.

5. The method of claim 1, wherein at least one of the receiving, the creating, the determining, the transcribing and the providing occurs in real-time.

6. The method of claim 1, wherein the receiving is via a single microphone.

7. The method of claim 1, further comprising verifying whether the current waveform is of a human voice, wherein the verifying whether the received current waveform is of the human voice comprises determining whether approximately ninety percent or more of frequencies of the current waveform occur in a frequency band from approximately 200 Hz-800 Hz.

8. The method of claim 1, further comprising:
   adding the voiceprint to the one or more library waveforms if the voiceprint is unique; and
   averaging the voiceprint with the one library waveform if the match exists between the voiceprint and the one library waveform of the one or more library waveforms.

9. The method of claim 1, wherein the creating the voiceprint from the current waveform comprises:
   dividing the current waveform into equal lengths of frequency range;
   determining an average amplitude of the current waveform for each of the equal lengths of frequency range;
   storing the average amplitude of the current waveform for each of the equal lengths of frequency range as the voiceprint in a storage system; and
   updating the average amplitude of the current waveform for each of the equal lengths of frequency range.

10. The method of claim 9, wherein the determining whether the match or the correlation exists or whether the voiceprint is unique comprises:
   determining an integer difference between the average amplitude of the current waveform and the one or more library waveforms for each of the equal lengths of frequency range;
   if the integer difference for each of the equal lengths of frequency range for the one library waveform of the one or more library waveforms is less than a match threshold, determining that the match exists between the voiceprint and the one library waveform of the one or more library waveforms;
   if the integer difference for at least one of the equal lengths of frequency range for each of the library waveforms is more than a unique threshold, determining that the voiceprint is unique; and
   if the voiceprint does not meet the match threshold and does not meet the unique threshold, determining that the correlation exists between the voiceprint and the number of library waveforms of the one or more library waveforms based on the integer difference for each of the equal lengths of frequency range.

11. The method of claim 10, wherein a degree of the correlation between the voiceprint and the number of library waveforms is displayed as a match percentage for each of the number of library waveforms.

12. The method of claim 11, further comprising
   determining a library waveform of the number of waveforms having a highest match percentage;
   determining a ratio of remaining match percentages for each of the number of library waveforms to the match percentage of the library waveform having the highest match percentage; and if the ratio for each of the number of library waveforms do not exceed a relative weight threshold, associatively displaying the current waveform with the library waveform having the highest match percentage.

13. The method of claim 12, wherein the MID further provides an unassigned transcribed text window; and
if the ratio for any of the number of library waveforms do exceed the relative weight threshold, displaying the transcribed text of the current waveform in the unassigned transcribed text window.

14. The method of claim 1, wherein the MID further provides a temporal indication for the text.

15. The method of claim 14, wherein the temporal indication for the text comprises at least one of:
indicator arrows which change colors based on temporal proximity to current time;
indicator arrows which fade or become translucent based on temporal proximity to current time; and
sequential numbers associatively displayed with the text.

16. The method of claim 1, wherein a service provider at least one of creates, maintains, deploys and supports the computer infrastructure.

17. The method of claim 1, wherein steps are provided by a service provider on a subscription, advertising, and/or fee basis.

18. The method of claim 1, wherein the transcribing the current waveform into text occurs in real time.

19. A system, comprising:
a human voice verification (HVV) tool operable to verify whether a received current waveform is of a human voice;
a voiceprint creation (VPC) tool operable to create a voiceprint from the received current waveform if the received current waveform is of the human voice;
a matching tool operable to determine one of:
whether a match exists between the voiceprint and one library waveform of one or more library waveforms;
whether a correlation exists between the voiceprint and a number of library waveforms of the one or more library waveforms; and
whether the voiceprint is unique; and
a display tool operable to:
transcribe the received current waveform into text; and
provide a match indication display (MID) indicating an association between the received current waveform and the one or more library waveforms based on the determining of the matching tool.

20. The system of claim 19, wherein the MID is further operable to:
display the received current waveform and the one or more library waveforms; and
associatively display the text with its associated library waveform.

21. The system of claim 19, wherein the indicating the association comprises displaying at least one of a match percentage and an indicator arrow.

22. The system of claim 19, wherein at least one of the HVV tool, the VPC tool, the matching tool and the displaying tool operate in real-time.

23. The system of claim 19, wherein the MID further provides a temporal indication for the text comprising at least one of:
an indicator arrow which change colors based on temporal proximity to current time;
an indicator arrow which fade or become translucent based on temporal proximity to current time; and
sequential numbers associatively displayed with the text.

24. The system of claim 19, wherein the transcribing the current waveform into text occurs in real time.

25. A computer program product comprising a computer usable storage medium having readable program code embodied in the storage medium, the computer program product includes at least one component operable to:
receive a current waveform of a communication between a plurality of participants;
create a voiceprint from the current waveform;
determine one of:
whether a match exists between the voiceprint and one library waveform of one or more library waveforms;
whether a correlation exists between the voiceprint and a number of library waveforms of the one or more library waveforms; and
whether the voiceprint is unique;
transcribe the current waveform into text; and
provide a match indication display (MID) displaying the text and indicating an association between the current waveform and its associated text, and the one or more library waveforms based on the determining.

26. The computer program product of claim 25, wherein the transcribing the current waveform into text occurs in real time.

27. A method comprising:
providing a computer infrastructure operable to:
receive a current waveform of a communication between a plurality of participants;
verify whether the current waveform is of a human voice;
create a voiceprint from the current waveform if the current waveform is of the human voice;
determine one of:
whether a match exists between the voiceprint and one library waveform of one or more library waveforms;
whether a correlation exists between the voiceprint and a number of library waveforms of the one or more library waveforms; and
whether the voiceprint is unique;
transcribe the current waveform into text; and
provide a match indication display (MID) displaying the text and indicating an association between the current waveform and its associated text, and the one or more library waveforms based on the determining,
wherein at least one of the receiving, the verifying, the creating, the determining, the transcribing and the providing occurs in real-time.

28. The method of claim 27, wherein the computer infrastructure is operable to receive the current waveform of the communication between the plurality of participants via a single microphone.

29. The method of claim 27, wherein the transcribing the current waveform into text occurs in real time.

* * * * *